United States Patent [19]
Michalko

[11] 3,861,964
[45] Jan. 21, 1975

[54] BATTERY CONSTRUCTION CAPABLE OF SAFELY VENTING INTERNAL PRESSURE

[75] Inventor: Ignatius Michalko, Ossining, N.Y.

[73] Assignee: Power Conversion, Inc., Mt. Vernon, N.Y.

[22] Filed: Jan. 30, 1973

[21] Appl. No.: 327,938

[52] U.S. Cl. ............................. 136/177, 136/178
[51] Int. Cl. ........................................ H01m 1/02
[58] Field of Search ................. 136/133, 177, 178

[56] References Cited
UNITED STATES PATENTS

| | | | |
|---|---|---|---|
| 2,934,584 | 4/1960 | Warren et al. | 136/133 |
| 3,143,441 | 8/1964 | Coleman et al. | 136/133 X |
| 3,558,362 | 1/1971 | McHenry | 136/133 |

*Primary Examiner*—Winston A. Douglas
*Assistant Examiner*—John F. Niebling
*Attorney, Agent, or Firm*—Hopgood, Calimafde, Kalil, Blaustein & Lieberman

[57] ABSTRACT

A battery capable of safely venting its contents includes a casing within which the electro-chemical system of the battery is confined and a cover disposed across the opening in the casing. One of more slots extend inwardly from the perimeter of the cover. Preferably at least three slots are used. A seal engages the perimeter of the cover and overlies the slot of slots. At a predetermined internal pressure, the cover is deformed sufficiently to expose a slot and release the pressure, but the cover does not become disengaged from the casing.

6 Claims, 2 Drawing Figures

PATENTED JAN 21 1975 3,861,964

BATTERY CONSTRUCTION CAPABLE OF SAFELY VENTING INTERNAL PRESSURE

BACKGROUND OF THE INVENTION

This invention relates to a battery construction, and more particularly a new and improved battery construction including a provision for releasing internal pressure through slots provided in a cover.

A persistent problem associated with the design of many types of batteries is that, under certain conditions, the internal pressure generated by the electrochemical system contained within the battery is such that the battery explodes. This pressure may be produced by a chemical reaction or by the expansion of gases in the presence of heat. Many times, the explosion takes the form of the battery cover disposed across an opening at one end of a cylindrical battery casing becoming detached and acting as a projectile. This highly dangerous phenomenon may occur if a battery is thrown into a fire or overheated in some other way. Some batteries will explode if, for instance, left in the hot glove compartment of an automobile. In addition, some batteries will produce an explosion if short circuited or if recharged too rapidly or for too extended a time period. Other explosions have occurred when an attempt has been made to recharge a battery which is not intended to be rechargeable.

This long standing problem in battery construction has taken on added importance with recent advances in high performance batteries. It is desired to employ certain electro-chemical systems, such as those used in a battery including lithium as an electrode and sulfur dioxide as a depolarizer, which in many instances have a greater propensity than conventional LeClanche cells and other well-known batteries to reach an explosive state because of the high vapor pressure of the electrolite and its volatile nature. One such battery is disclosed in U.S. Pat. Application Ser. No. 203,976, filed on Dec. 2, 1971, now U.S. Pat. No. 3,748,186, entitled "Method for Filling Sealed Batteries."

Accordingly, there is presently a need for a new type of battery construction which, in the event of an increase in the internal pressure of the battery, would allow the battery contents to be safely vented without an explosion.

SUMMARY OF THE INVENTION

According to this invention, a battery including provision for safely venting internal pressure at a predetermined upper limit comprises a casing within which the electro-chemical system of the battery is confined and a cover disposed across an opening in the casing. The cover defines at least one slot extending inwardly from its perimeter. The battery is sealed by a means for engaging the cover which overlies the slot. The cover is deformable sufficiently to expose a slot and release the internal pressure once a predetermined pressure limit has been reached.

In a preferred embodiment, the battery casing is cylindrical in shape and is closed at one end and opened at the other. The cover, which is disc-shaped, is disposed across the opened end. This construction is particularly well suited for relatively small batteries, e.g., a C cell.

BRIEF DESCRIPTION OF THE DRAWINGS

An understanding of additional aspects of the invention can be gained from a consideration of the following detailed description of various representative embodiments of the invention taken in conjunction with the appended drawings wherein.

DESCRIPTION OF THE PREFERRED EMBODIMENT

Figure 1:
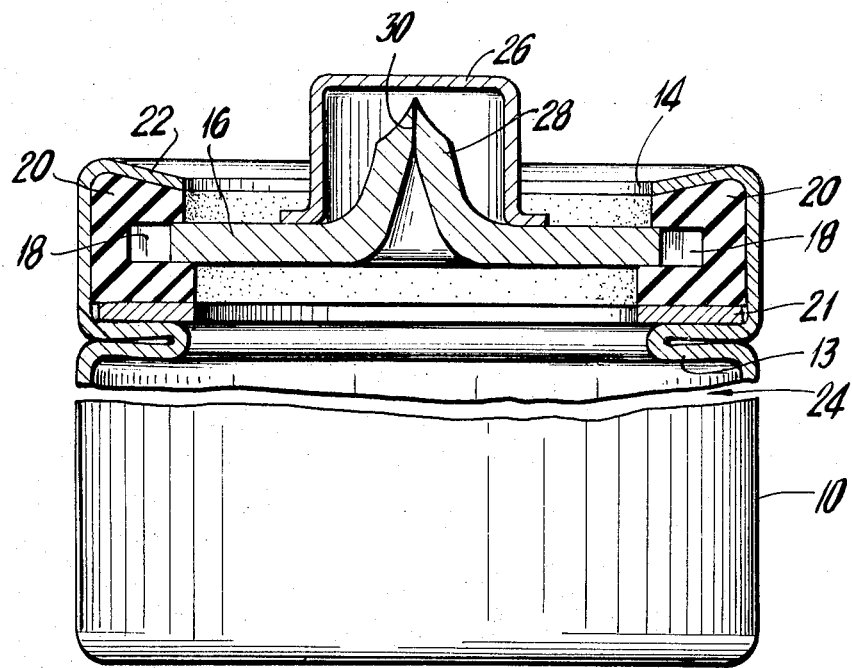
FIG. 1 is a cross-section view of a battery construction in accordance with the invention.

A battery construction capable of safely venting its contents without exploding and designed in accordance with the concept of this invention is shown in FIG. 1. It includes a cylindrical steel battery casing 10 closed at its bottom end 12. Only fragments of the vertical side walls are shown, but it will be understood that the casing 10 forms an elongated cylinder. The casing 10 is necked about its perimeter to form a ridge 13 along the interior of the casing spaced from its open top end 14.

Figure 2:
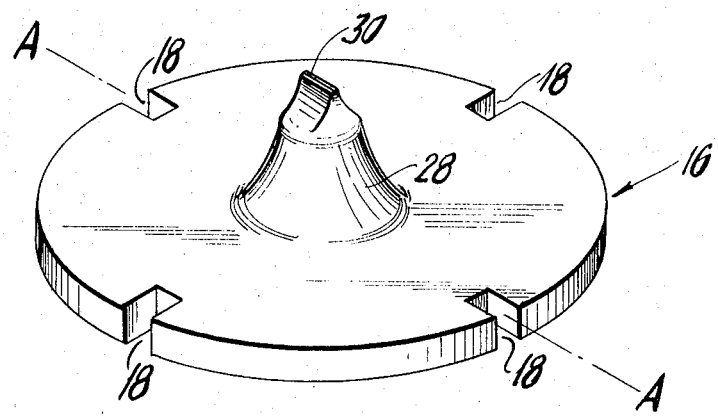
FIG. 2 is a prospective view of the cover of the battery as shown in FIG. 1.

Disposed across the open end 14 of the casing 10 is a disc-shaped cover 16, a prospective view of which is shown in FIG. 2. The cover 16 is formed of a deformable material (metal) and defines a plurality of spaced-apart slots 18 each of which extend inwardly from its perimeter toward its center. In the embodiment depicted herein there are four such slots separated by 90°. In FIG. 1, the cover 16 has been sectioned along the line A—A of FIG. 2.

The perimeter of the cover 16 is surrounded and engaged by an annual elastomeric sealing member and insulator 20, which functions are a means that overlies the slots 18 on both the upper and lower surfaces of the cover 16. The sealing member 20 is squeezed between a rigid metallic thrust ring 21 which presses upwardly and a crimped edge 22 formed by the inwardly bent perimeter of the open end 14 of the casing 10 which presses downwardly. The thrust ring 21 is seated, on its underside, against the internal ridge 13 formed by necking the casing 10. It is important that the sealing member 20 have sufficiently low plasticity that over a period of time it will not flow and fill the slots 18. A cap 26 is welded atop the center of the cover 16 and forms one terminal of the battery. In this embodiment, the cover 16 is manufactured with an upstanding tubulation 28 at its center, which is pinched and cold-welded to form a seam 30 after the electro-chemical system has been injected therethrough into a cavity 24 within the casing 10. This seam 30 is hidden beneath the cap 26.

The above construction confines the electrochemical system of the battery under normal conditions. However, the cover 16 is sufficiently soft and ductile to be bendable in response to excessive internal pressure generated by the electro-chemical system of the battery. As the pressure increases and the cover 16 begins to deform outwardly in response thereto, the innermost portion of one or more of the slots 18 will move past the inner periphery of the sealing member 20. This provides a passageway through which the contents escape and the internal pressure is released once this pressure has reached a predetermined limit. Preferably, the battery components are dimensioned so that the sealing means 20 extends beyond each slot 18 on the top and bottom of the cover 16 by between 30 percent and 5 percent of the length of the slot. It is desirable to have at least three slots in the cover 16 to insure the one will be included in the portion of the cover 16 first deformed by the internal pressure.

Although the invention has been described above with reference to a specific embodiment, many modifications and variations therein will readily occur to those skilled in the art. For example, this battery construction will be useful with many different electrochemical systems that are capable of generating an internal pressure. Moreover, the number, position, width, configuration and depth of the slots extending from the periphery of the cover may be varied. All such modifications and variations are intended to be included within the scope of the present invention.

I claim:

1. A battery capable of safely venting its contents at a predetermined pressure comprising a casing open at one end within which an electro-chemical system capable of generating high internal pressure is confined, an internal ridge spaced from the open end of the casing, cover means disposed across the open end of the casing for closing sand open end, said cover means defining a plurality of slots that extend inwardly from the perimeter thereof, a compressible sealing member that engages the perimeter of the cover and overlies the slots, and an inwardly extending portion at the open end of the casing which engages the sealing member, said internal ridge being spaced from said open end to effect pressing of the sealing member against the inwardly extending portion, said cover means being deformable to expose a slot and rapidly release the internal pressure when a predetermined pressure limit has been reached.

2. The battery of claim 1, wherein said cover means includes at least three of said slots.

3. The battery of claim 1, wherein said internal ridge is formed by a necked portion of the casing.

4. The battery of claim 3, further comprising a rigid thrust ring disposed between the ridge and the sealing member which retains the sealing member against the underside of the cover means so that it overlies the slots.

5. The battery of claim 1, wherein the sealing member extends beyond along the top and bottom of the cover means by between about 5 percent and 30 percent of the length of the slot.

6. The battery of claim 1, wherein said casing is cylindrical, said cover means is disc-shaped, and said internal ridge is formed by a necked portion of the casing.

* * * * *

UNITED STATES PATENT OFFICE
CERTIFICATE OF CORRECTION

Patent No. 3,861,964　　　　　　　　　　Dated January 21, 1975

Inventor(s) MICHALKO, IGNATIUS

It is certified that error appears in the above-identified patent and that said Letters Patent are hereby corrected as shown below:

Claim 1, column 3, line 21 "sand" should be --said--.

Signed and sealed this 1st day of April 1975.

(SEAL)
Attest:

RUTH C. MASON
Attesting Officer

C. MARSHALL DANN
Commissioner of Patents
and Trademarks